Nov. 11, 1941. H. C. LORD 2,262,243
AIR CONDITIONING, METHOD AND APPARATUS
Filed May 3, 1937 7 Sheets-Sheet 1

INVENTOR.
Hugh C. Lord

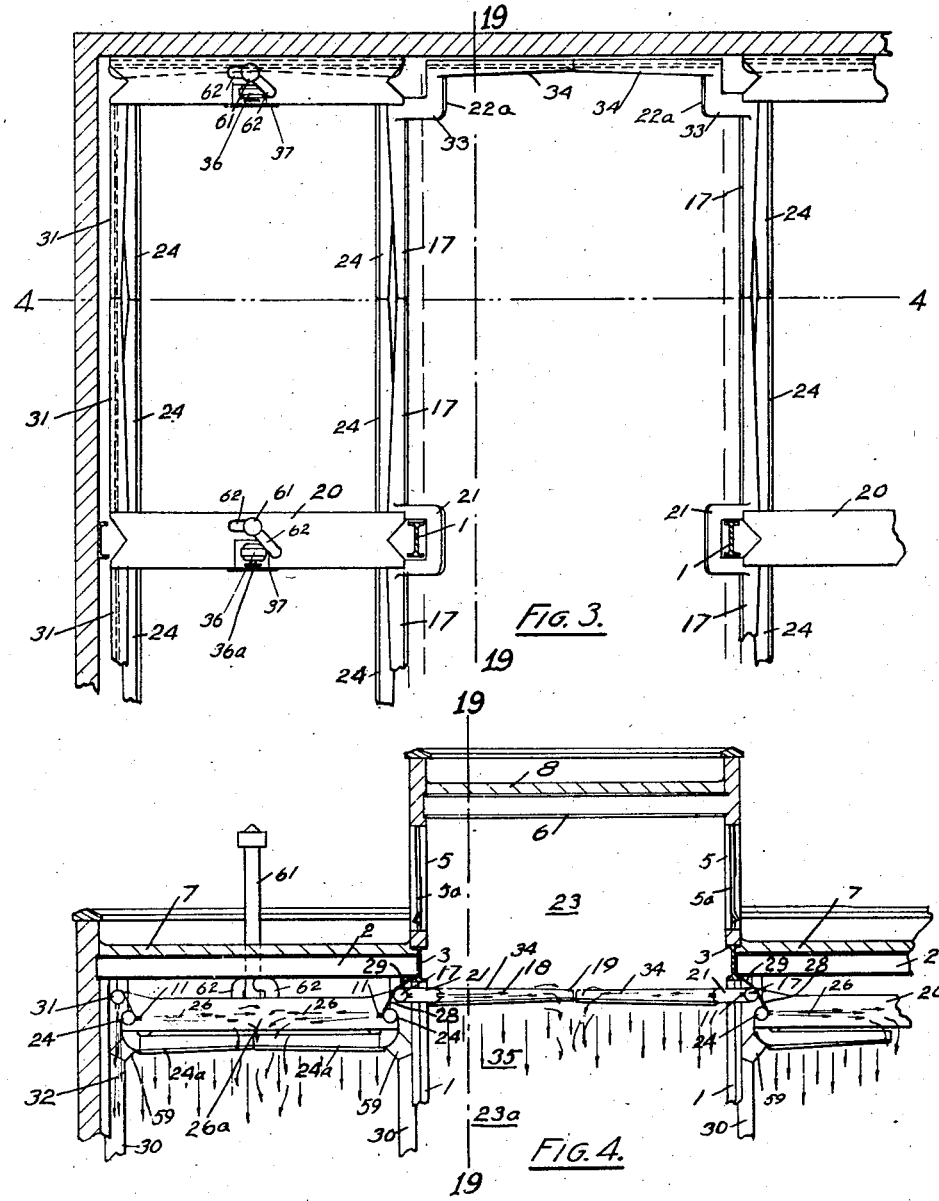

Nov. 11, 1941.   H. C. LORD   2,262,243
AIR CONDITIONING, METHOD AND APPARATUS
Filed May 3, 1937   7 Sheets-Sheet 3
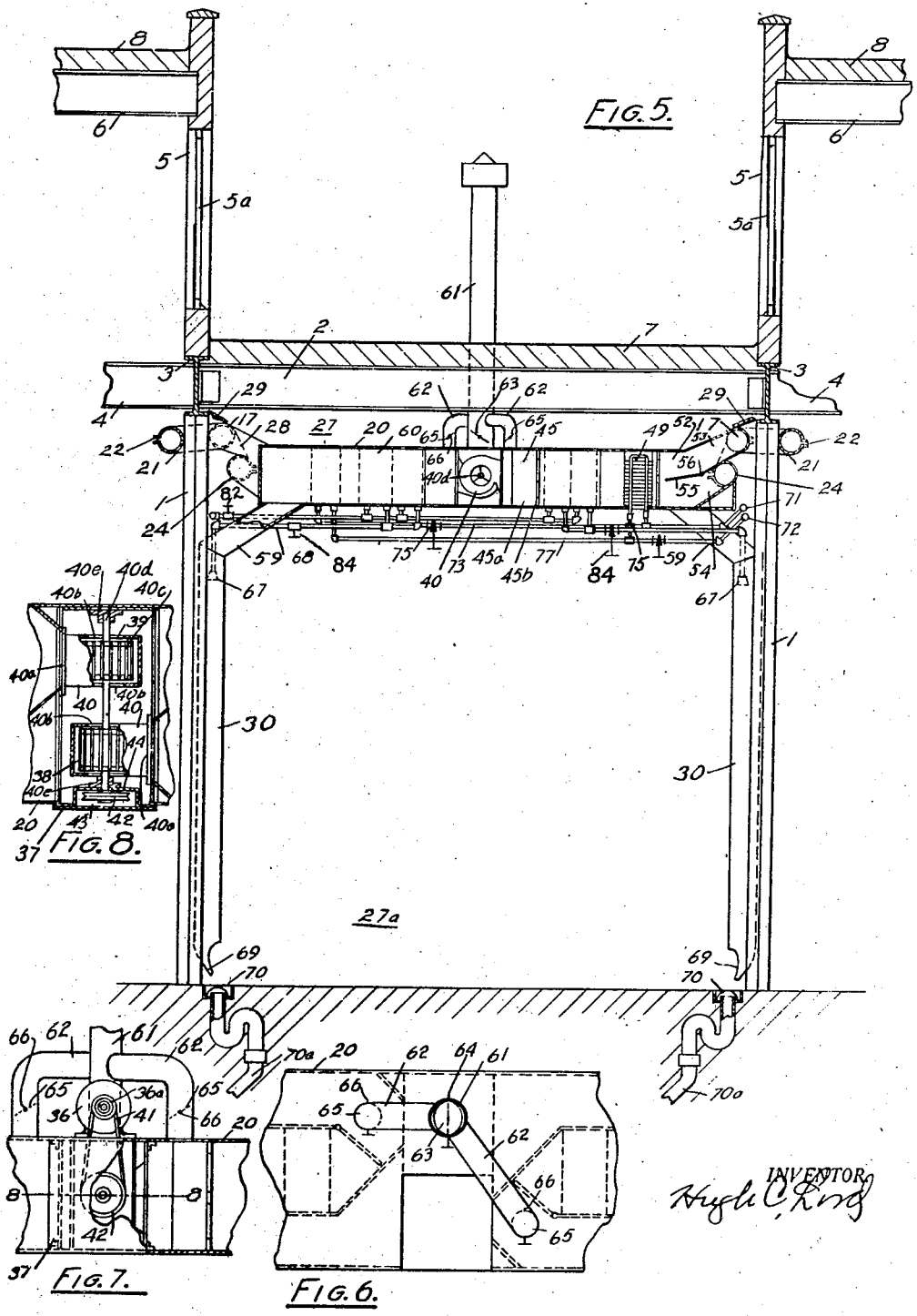

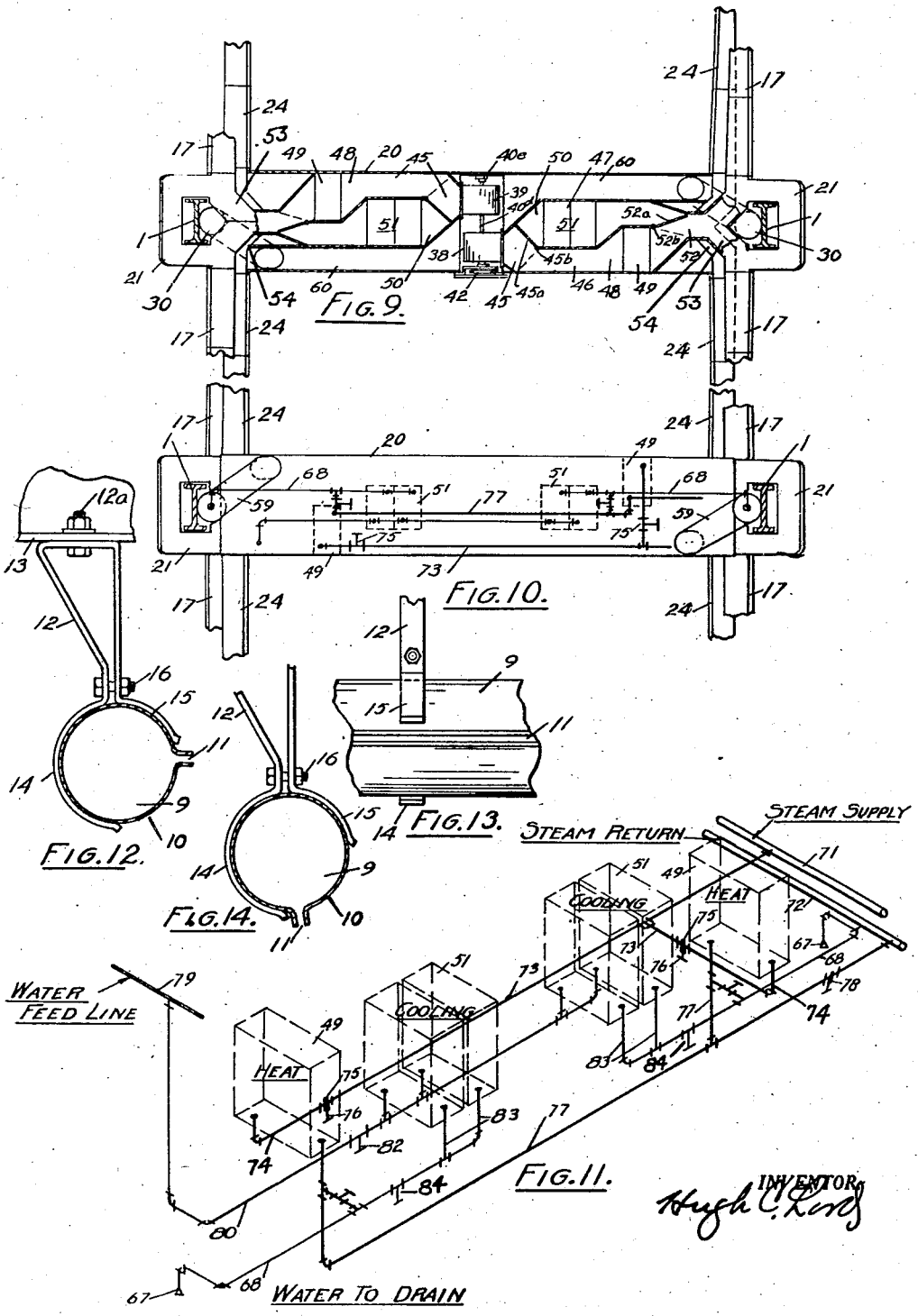

Nov. 11, 1941.     H. C. LORD     2,262,243
AIR CONDITIONING, METHOD AND APPARATUS
Filed May 3, 1937     7 Sheets-Sheet 5

INVENTOR
Hugh C. Lord

Nov. 11, 1941.  H. C. LORD  2,262,243
AIR CONDITIONING, METHOD AND APPARATUS
Filed May 3, 1937  7 Sheets-Sheet 6

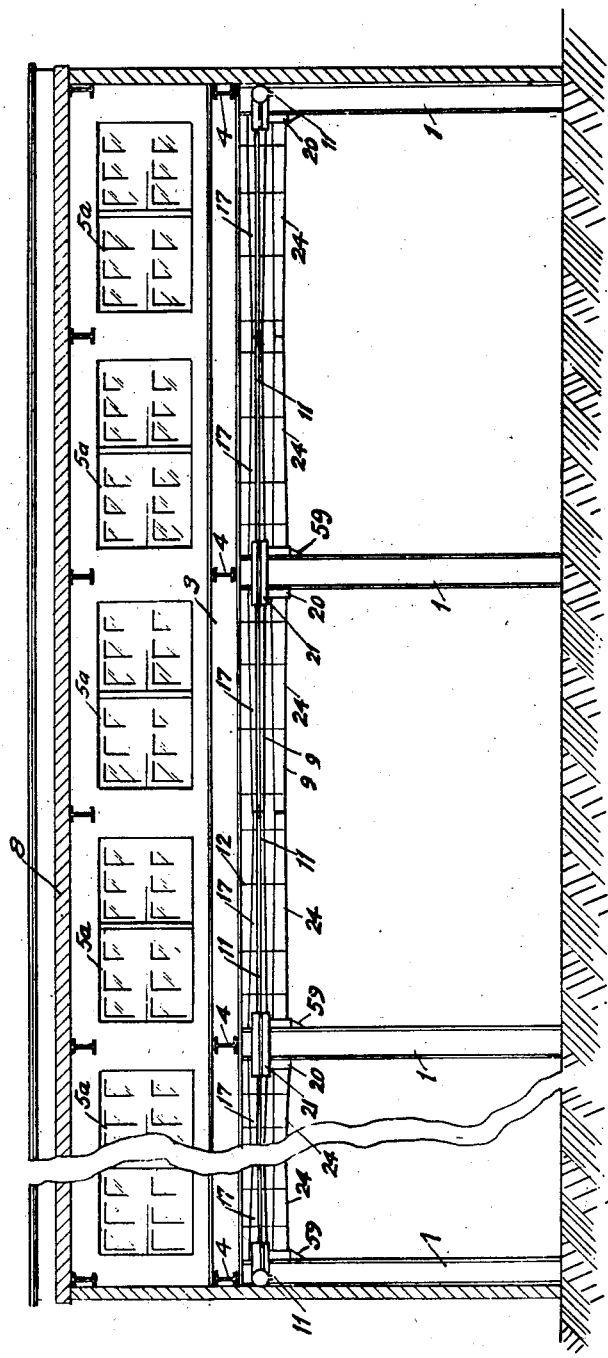

Patented Nov. 11, 1941

2,262,243

UNITED STATES PATENT OFFICE 2,262,243

AIR CONDITIONING, METHOD AND APPARATUS

Hugh C. Lord, Erie, Pa.

Application May 3, 1937, Serial No. 140,523

11 Claims. (Cl. 98—33)

The present invention is designed for air conditioning, heating, cooling and ventilating, and in the form exemplified in the drawings it is adapted for air conditioning, heating and ventilating in shops, although in its broader phases it is not so limited.

One of the features of the invention is the stratification of the air adjacent the floor from the air adjacent the roof and this is particularly advantageous in single story buildings where the roof exposure is a factor in heat exchange, intensifying the heat in the summer and the cold in the winter. In carrying out this feature of the invention a projected sheet of air is provided substantially throughout the entire area of the building and this sheet of air is so controlled that the major portion of the air is circulated, if desired, in the lower strata of the building. To accomplish this in the form illustrated, the air is projected through slits in opposing ventilating tubes in each side of the bay of the building, the sheets of air so projected abutting at approximately the center of the bay and the direction of the sheet being adjusted so that substantially all the air at the abutting point is carried downwardly and returned to the ventilating flues opening at the floor of the building. In this way the energy involved in the projection of the air is utilized to insulate one stratum from the other, the moving sheet largely preventing any penetration of the air from one stratum to the other. The impingement of the air at the center of the bay retards the movement of the sheet, and effects a general diffusion of the air in its downward movement in the floor stratum. The jets are adjustable so that the direction of the sheet and proper impingement may be accomplished so as to assure the downward movement of the air in the circulation particularly as the exhaust of the lower stratum in the air circulation creates a pull in the downward direction.

In the preferred form, using a monitor type building for exemplifying the invention, the fans and heating and cooling units with their ducts are arranged below the low bays of the monitor roof so as to avoid any obstruction of light from the monitors. Preferably units are arranged in the centers of the low bays supplying opposing sheets of air for the low bays and projecting the sheets from both adjacent high bays for impingement in a similar sheet from the opposite side of the high bay. It will be understood, however, that each sheet may have a separate unit, or each sheet forming duct may have a separate unit, or each pair of sheet projecting ducts may have a common unit. In the preferred form, however, each unit handles four sheets.

Numerous controls may be provided in the preferred form and manner of use as shown. Adjusted for winter use, a slight amount of air is discharged through the roof stratum from the discharge sides of the fans, this creates a deficiency in the lower stratum and, therefore, induces a compensating amount of air from the other stratum, this air being supplied through openings or leakage in the monitors. Adjusted for summer use, a slight amount of fresh air is bled into the intake of the fans, thus creating an excess of air in the floor stratum which excess forces an upward discharge in proportion to that taken in at the intake and this air delivered to the roof stratum finds its way out through the monitors or the openings at the roof. The reason for this change of adjustment is that in the winter the roof stratum will have a temperature between that of the floor stratum and the roof temperature so that taking in the ventilating requirements from this stratum is more economical than taking it from the outer air, while in the summer it is not desirable to induce any flow of the roof stratum to the floor stratum but quite the contrary, and consequently the excess air drawn in is discharged to the roof stratum and to that extent reduces its temperature somewhat.

In delivering the air to the ducts projecting the insulating and ventilating sheets, the air may be heated by radiators in the manner of devices known as unit heaters, and this may be regulated by by-passing the air or by controlling the fan or the steam as is practiced with unit heaters.

Cooling radiators may also be introduced into the ducts for cooling the air using the same fans and preferably one of the by-pass ducts may be used for heating and the other for cooling with proper closure valves so that the air may be passed through either the heating radiators, the cooling radiators, or may be simultaneously passed through both. In using the structure it may be desirable to wash the air and the apparatus is provided with spray devices delivering spray to the up-take of the incoming air.

In the preferred form also an insulating sheet of air is directed downwardly substantially parallel and adjacent to the outer walls of the building. This insulating sheet segregating a stratum next the wall of the building from that within the insulating sheet, warming this exposed part of the building in the winter and cooling this exposed part of the building in the summer.

Under some conditions it may be desirable to vary the manner of delivering the air, particularly in summer, and the apparatus is so arranged that all the air leading to the fans may be taken from outside the building and where this is done it is preferable to project this air forming a seal over the low bay permitting the air to pass downward and into the floor stratum and floor sidewise into the high bay and rise in the high bay to be discharged from the monitors, the sealing jet of air in the high bay being omitted.

The apparatus may be very largely varied for carrying out the general plan. Further features of the invention will appear from the specification and claims.

A preferred embodiment of the apparatus of the invention and one with which the method may be practiced is illustrated in the accompanying drawings as follows:

Fig. 3 shows a plan view of the corner of a building.

Fig. 4 a section on the line 4—4 in Fig. 3.

Fig. 5 shows an enlarged cross section crosswise of the building.

Fig. 6 a plan view of the central portion of the main duct.

Fig. 7 a side elevation of the portion shown in Fig. 6.

Fig. 8 a section on the line 8—8 in Fig. 7.

Fig. 9 shows the main duct with its cover removed.

Fig. 10 is a bottom view of the main duct.

Fig. 11 a diagram of the piping for the radiators.

Fig. 12 a cross section of one of the jet ducts with the jet arranged horizontally.

Fig. 13 a fragment of the jet duct.

Fig. 14 a cross section of the jet duct adjusted for vertical discharge.

Figure 15:
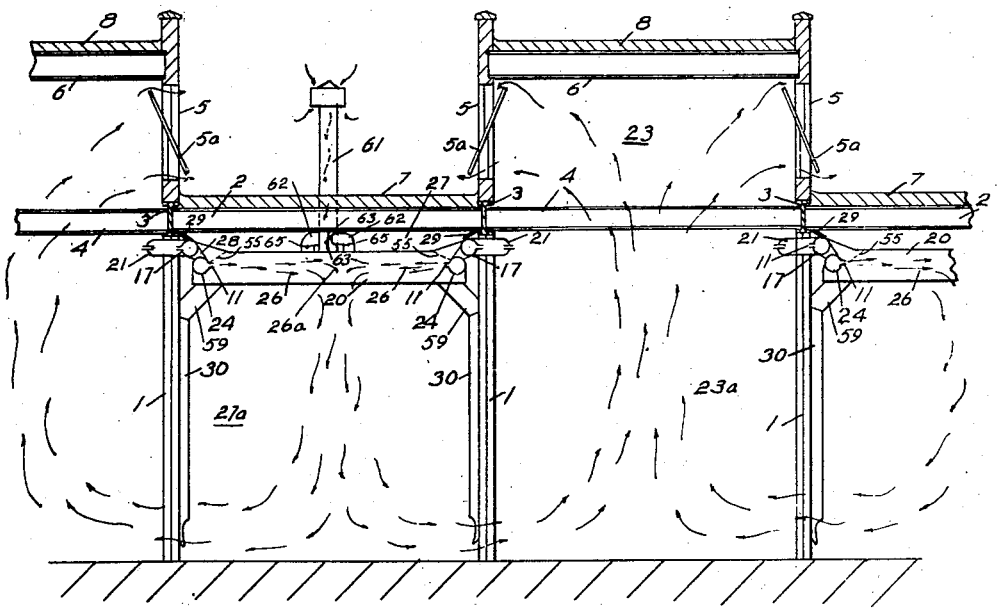

Fig. 15 shows a cross section of a modified arrangement of the controls.

Figure 16:
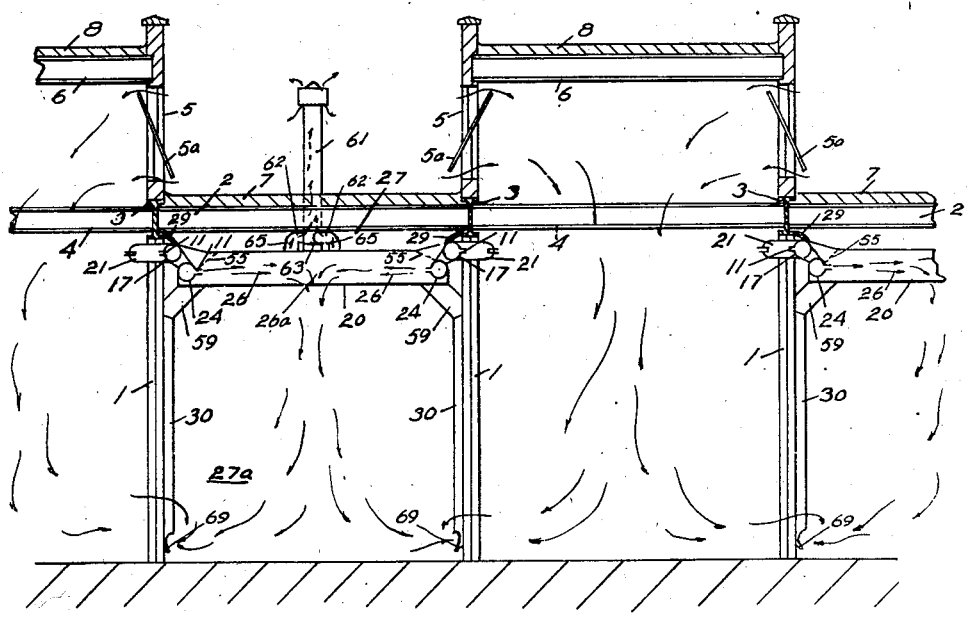

Fig. 16 a further modification.

Figure 17:
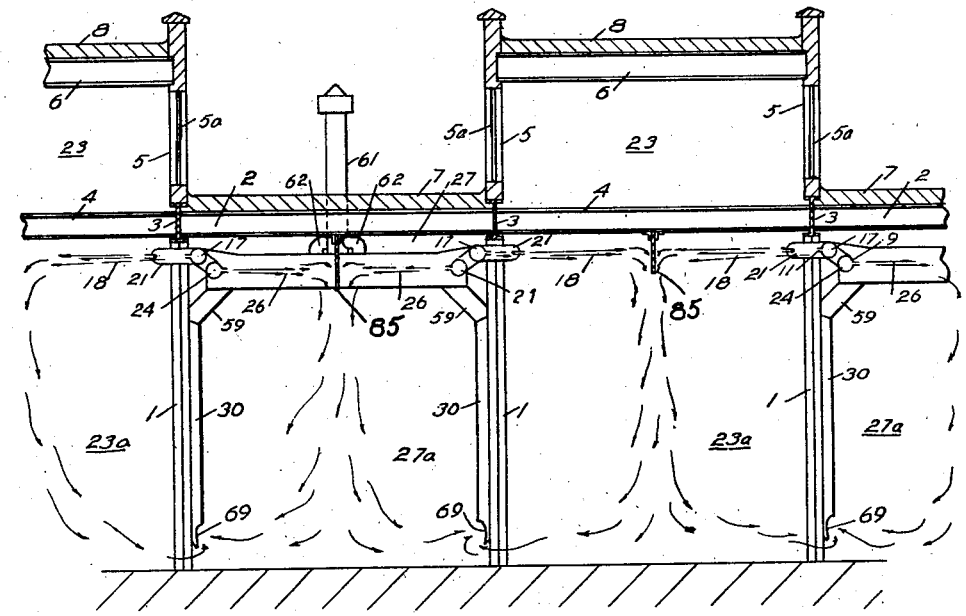

Fig. 17 shows a modification.

Figure 18:
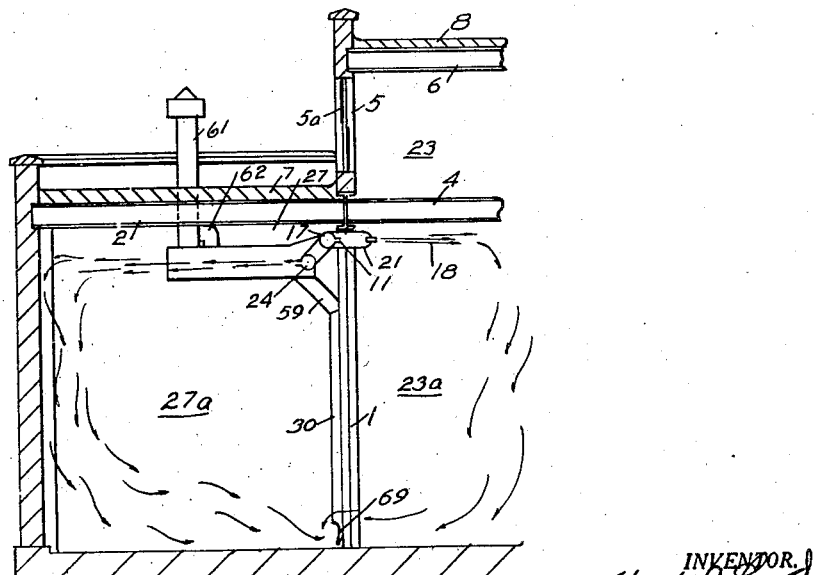

Fig. 18 shows a modification.

Figure 1:
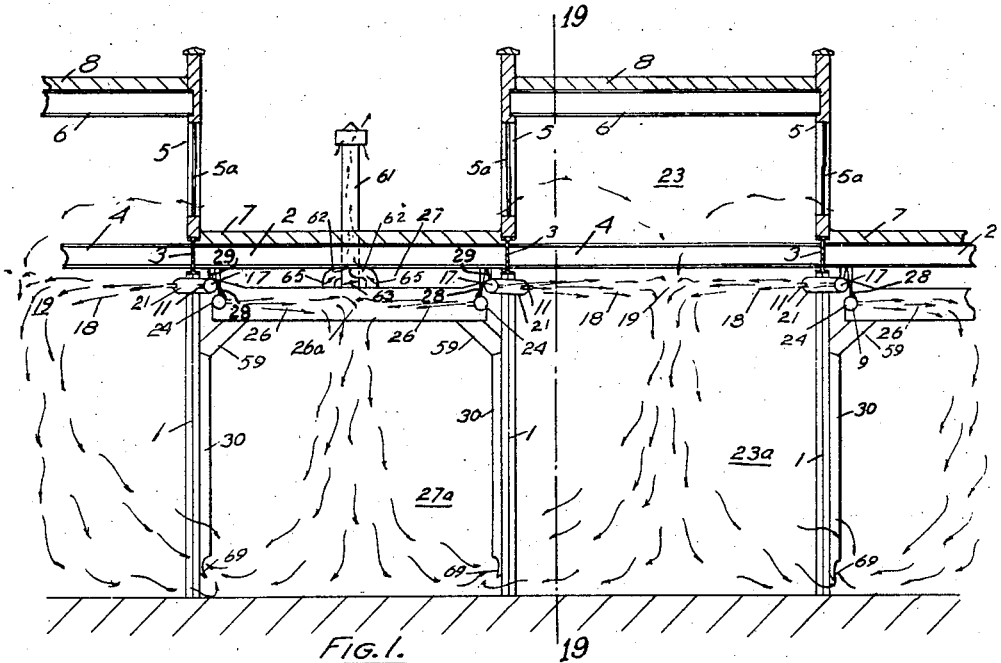
Fig. 1 shows a section crosswise of the building showing a low bay and showing the control set for winter use.

Fig. 19 shows a vertical section on the lines 19—19 in Figs. 1, 3 and 4.

As the invention is illustrated, it is installed in a standard monitor type building having the posts 1, cross girders 2 for the tube for the low bays, longitudinal girders 3 between the posts 1, beams 4 tying the posts across the high bays, 5 the monitor posts above the posts 1, 6 beams across the high bays, 7 and 8 roofs for the low and high bays respectively. The monitors are provided with window vents 5a which may be opened or closed according to conditions. Jet ducts in the form of ducts 9 are used for the air (see Figs. 12, 13 and 14). The ducts have an annular wall 10 terminating in a nozzle-shaped slot 11 designed to deliver or project an insulating sheet of air. These ducts are mounted on hangers 12 which are secured to a beam 13 by bolts 12a. These hangers are preferably formed of a bar of iron, of triangular shape, the lower end of the triangle being open and one side of the triangle being provided with an arm 14 curved to conform to the tube and the other side of the triangle terminating in a curved arm 15 conforming to the tube and the arms of the triangle being slightly separated at their lower ends and adjacent to the tube, and provided with an adjusting screw 16 which is so adapted to adjust the distance between the arms 14 and 15 as to adjust the width of the nozzle or slot. The arms also form clamps which are adapted to engage the walls of the tube and lock it against turning. The shape of the hanger braces the tube against the reaction of the jet. Jet tubes 17 are provided for the high bays, the nozzles being set to project a sheet 18 into impinging relation at 19 with a jet from an opposing nozzle. The air is conducted to these jet tubes from a main duct or box 20 which extends across the low bay between posts 1. The duct 17 has a loop 21 which extends around the post 1 and is provided with a slot similar to slot 11 to form the insulating sheet in front of the post. The sheet 18 forms a roof stratum 23 above the sheet and a floor stratum 23a below the sheet. A jet duct 24 is arranged longitudinally, slightly below and inside of the jet duct 17. The jet ducts 24 have their nozzles arranged to project sheets 26 which are adjusted to impinge at 26a at the center of the low bays, segregating the roof stratum 27 from the floor stratum 27a. The sheets from ducts 17 and 24 are projected in lanes, the space between the lanes from the ducts 17 being closed by the sheets from the loops 21 and the space between the lanes projected from the ducts 24 by the boxes 20. The space between the ducts 17 and 24 is closed by closure plate 28 preferably insulated, and the space between the duct 17 and the roof is closed by adjustable closure plate 29 so that the opening above the duct 17 between the roof stratum 27 and roof stratum 23 in the monitor may be connected or closed by opening or closing the plate 29. Any convenient means may be used for mounting and actuating the plates 28 and 29. An uptake duct 30 leads from the floor level and forms the return for the circuit for the down flowing air from both bays, and by ducts hereinafter described is connected in the circuit.

At the sides of the building the upper jet ducts 31 have their nozzles directed downwardly so as to project an insulating sheet 32 along the wall. Ducts 54 extend from the duct 52 at the end of the building to the jet ducts 24a (see Fig. 4). The ducts 17 at the end and the end ducts 34 are connected by corner ducts 33 forming a half of a loop 21 and are provided with the slots 22a continuing the sheet formed by the end ducts 17 to the end of the building. These ducts 24a and 34 are provided with downward extending jet nozzles providing the insulating sheets 35 along the end of the building.

The power unit and fans and distribution ducts leading to and from the fan are shown in detail in Figs. 6, 7, 8, 9, and 10, substantially the same detail being used in each of the figures. These comprise a motor 36 which is mounted on the top of a fan unit drawer 37 which is adapted to slide into the main duct or box 20. The two fan assemblies 38 and 39 are arranged in the drawer. Each of these fans is provided with a case 40 having a discharge 40a and an intake opening 40b. The fan blades 40c are mounted on a shaft 40d which shaft is journaled in bearings 40e. The motor has a drive pulley 36a and a belt 41 extends from pulley 36a to a pulley 42 on the shaft 40d. The drawer is provided with a pocket 43 through which the shaft 40d extends, the pocket being divided from the chamber in the drawer by the wall 44. These parts are so arranged in the drawer that the discharge nozzles of the fans and the inlet opening leading to the drawer connect with the proper ducts in the main duct so that they are all connected by the mere closing of the drawer. With this structure it is possible, therefore, to merely withdraw this unit and substitute another in servicing.

One of the fans discharges in one direction to a duct 45 and the other fan discharges in the opposite direction to a similar duct 45. The ducts 45 branch to by-passes 46 and 47, one leading through the outside by-pass, having an enlargement 48 adapted to receive the heat radiators 49. The companion by-pass has an enlargement 50 in which is arranged the cooling radiators 51. The by-passes 46 and 47 converge to a passage 52 and four branches lead from the passage 52, upper passages 53 leading to the jet ducts 17 and 34, and lower passages 54 leading to the lower jet ducts 24 and 24a. A valve 55 is arranged in the passage 52 and the inlet ends of the passages 53 and is adapted to cut off the ducts 17. The valve plate 55 is mounted on a spindle 56 which extends through the side of the box and is provided with an adjusting means. A valve 45a is pivoted on a pin 45b which extends through the bottom of the box from which the valve may be controlled. The valve, as shown in Fig. 9, is swung to close the by-pass to the cooling radiators. It may be swung to close the by-pass to the heating radiators or may be made to occupy an intermediate position. A similar valve 52a controls the outlet to the by-passages. It is mounted on a pin 52b so that the valve may close the outlet from the passage 47 or 46 or may be made to occupy an intermediate position as desired. It will be noted that by closing valve 45a over the by-pass 46 and the valve 52a over the by-pass 47 the entire discharge from one fan to all the ducts at one end of the main duct may be cut off.

The uptake 30 is extended by an inclined duct 59 which communicates with the duct 60 extending along the main duct 20 and this duct 60 leads to the fan chamber formed by the drawer 37.

A vent pipe 61 extends through the roof and connects with the fan box. By-passes or ducts 62 lead from the passages 45 to the vent pipe 61. The vent pipe 61 is controlled by valve 63 mounted on a stem 64 by means of which the valve may be set and controlled. The ducts 62 are controlled by valves 65 which are mounted on pins 66 extending through the ducts by means of which these valves may be controlled.

The operation of these valves with the different air circuits desired will be hereinafter explained. A spray 67 is mounted in the uptake and connected by a pipe 68 with a water system for sources of water supply, this spray being designed to spray into the uptake for washing and conditioning the air as may be desired. The lower end of the uptake has a deflector 69 which carries any drip to an open spillway 70 leading to a collecting drain 70a.

The plumbing diagram for the main duct and radiators is as follows: The steam main 71 and a return main 72 extends longitudinally of the building along the posts 1. Branches 73 extend from the steam main along the main duct and have connections 74 controlled by valve 75 with stem 76 extending below the box so that the valve may be readily controlled. Branch line 77 leads from the steam radiators to the return main 72 these being supplied with valves 78.

A water main 79 extends longitudinally along the posts 1 connected by branches 80 with the cooling radiators 51. These branches are controlled by valves 82. Return discharge pipes 83 lead from the cooling radiators and may discharge to the sprays 67 and are controlled by valves 84. If preferred, the steam lines may be utilized for the cooling system by providing cross connections, not shown. Preferably all these controlling handles for the valves are carried to exposed portions below the box so that the controls may be readily handled, and as far as practical the stems for the different air valves also carry through the bottom box for a similar purpose.

The different jet tubes as 17 and 24 are rotatively mounted on the tubes such as 53 and 54 so that the direction of the jet may be adjusted, the hangers heretofore described being also arranged to permit of such adjustment. This is desirable so that the impingement of the projected sheets may be assured and also to so direct the insulating sheets that entrainment of air from the upper stratum may be largely avoided and also that the air at the point of impingement and turbulence that is projected in the sheet will be carried downward into the floor stratum. If the sheet is slightly deflected downward the resultant force of the jet will tend to carry the projected air downwardly but if carried to an extreme will also tend to entrain air from the upper stratum.

On the other hand if inclined upwardly, will tend to deliver some of the projected air into the upper stratum. The down pull from the exhaustion of the air through the uptakes, leakage to the upper stratum and other factors enter into this balance. By reason of the adjustability an approximate balance may be achieved to accomplish it. The air in circuit may be supplied with smoke and the conditions observed from above the insulating sheet and from such observation an adjustment made that will practically neutralize the different forces to effect the delivery of the greater part of the projected air into the lower stratum and prevent any large quantities of air from being entrained from the upper stratum.

Figure 2:
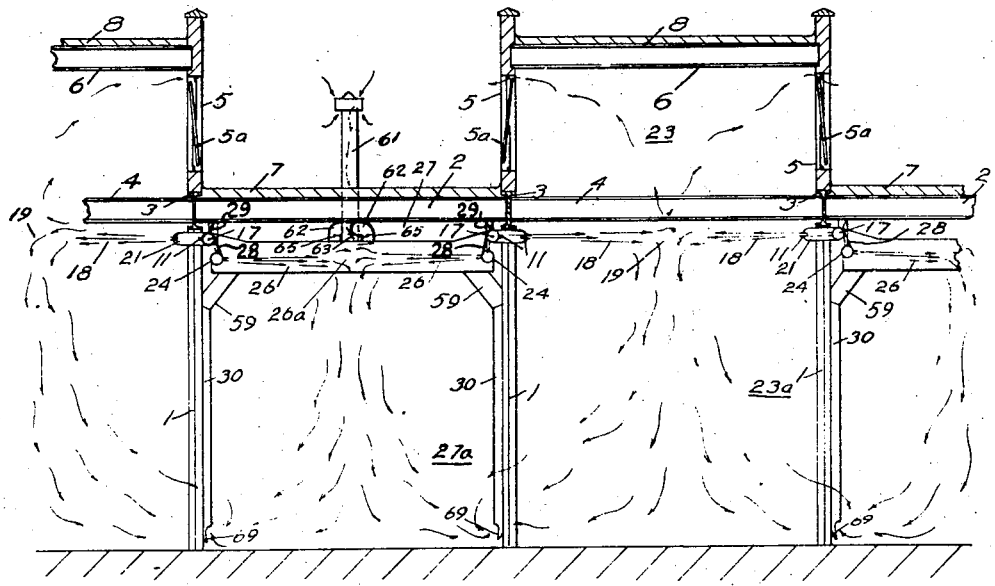
Fig. 2 shows a similar use with the control set for summer use.

In the operation it will be seen, as set with relation in Fig. 1, the valve 63 is closed and the valves 65 open to an extent to give the percentage desired of fresh air supplied through air leakage, or entry, through the windows of the monitor. The path of the air through the ducts is clearly indicated in Figs. 6, 7 and 8. With this setting a slight discharge of air through the duct 62 creates a deficiency in the ground strata which is compensated by air passing through the point of impingement from the upper stratum to the lower stratum. As set for summer use in Fig. 2, the valve 63 is slightly open and the valves 65 closed. In this manner the percentage of fresh air desired in the circulation may be controlled. This delivers an excess of air to the lower stratum which escapes upwardly to the upper stratum and out of the openings in the monitors.

I have shown the by-pass by means of which the air may be shifted from either radiator and thus permit an automatic control (not shown) if desired, as usually provided with unit heaters, but it will be understood that any other means of control such as motor control, steam or water control may be utilized for varying the capacity as desired. With either of the control methods in Figs. 1 and 2, the communication is open.

In the alternative setting, shown in Fig. 15, the jet tubes 17 are closed off by the valves 55. In this structure the communicating closure 29 may be entirely, but preferably very nearly closed, the air sheets being impinging near the middle of the low bay flow down in the low bay sideways into the high bay and are discharged from the high bay. In this control the vent valve 63 is wide open so that the full capacity of the fans is satisfied with fresh air and the valves 65 are closed.

In the setting shown in Fig. 16, the vent valve 63 is closed, the valves 65 are fully open, and valve 55 is closed. The plate 29 closes the opening. In this set-up the discharge of air through the tubes 62 is compensated for by air drawn in through the monitors. A part of the air is re-circulated, but with a full opening of the duct 62 a large volume of air comes in through the monitors.

In the modification shown in Fig. 17, the apparatus is similar to that shown in Fig. 1 with the exception that a fixed obstruction 85 is provided for the impingement of the sheets. The operation is similar to that of the structure shown in Fig. 1.

In the modification shown in Fig. 18, the jets adjacent the sides of the building are projected with sufficient force to provide the impingement at the wall of the building and the jet direction and the forces are adjusted to carry the major portion at least of the air downwardly so that it may be re-circulated. The control both as to introduction of fresh air and the exhaustion of the excess introduced is similar to that in Figs. 1 and 2.

It will be noted that filters may be substituted for either radiator 47, or 49, or a part may be applied to filters and part to radiators. It will also be understood that filters may be substituted entirely for either radiator 47, or 49, so that air, at intervals, or part of the air all the time, may be forced through filters leaving the full radiator capacity through the other bypass. Preferably, however, part of this space 48 and 50 should be occupied by radiators and filters, common filters and common radiators being used in each instance.

In all of these structures it is possible to maintain a controlled separated stratum of air with widely varying temperature, the temperature in the upper stratum being a medium between the roof temperature and that of the lower stratum. The comparatively dead air in the upper strata takes on whirls directly above one sheet induced by the service of the sheet so that its disturbance of the sealing portion of the sheet is very slight.

What I claim as new is:

1. The method of controlling distribution of air in a room which consists in stratifying different levels by sheets of projected air approximately sealing the different levels from each other and recirculating a major portion of the air and tempering the air as circulated, introducing the desired percentage of fresh air, and discharging the excess from the upper stratum.

2. The method of controlling distribution of air in a room which consists in stratifying different levels by opposing sheets of projected air moving in lanes of approximately the same direction, said sheets approximately sealing one level from the other throughout the area to be stratified and impinging intermediate the points of projection, and recirculating a major portion of the air.

3. The method of controlling distribution of air in a room which consists in stratifying different levels by opposing sheets of projected air, said sheets impinging intermediate the points of projection and directing the major portion of impinging air downwardly and recirculating a major portion of the air.

4. In combination with a room, opposing ducts having nozzles directing opposing sheets of air; means recirculating said air from below the sheets; and a vent leading from the top of the roof connected with said recirculating means.

5. In combination with a room, opposing ducts having nozzles directing opposing sheets of air; means recirculating said air from below the sheets; and a vent leading from the top of the roof connected with said recirculating means; and means for controlling intake and discharge through the vent.

6. The method of controlling the distribution of air in a room, which consists in stratifying different levels by opposing sheets of projected air, interposing fixed obstructions between said sheets having impingement intermediate the points of projection, and adjusting the direction of the jets for balancing the forces of impact to prevent other than a pre-determined transfer of air from one stratum to the other.

7. The method of controlling distribution of air in a room which consists in stratifying different levels by projecting substantially horizontally across the width of the room sheets of air having approximately the area to be stratified and approximately sealing the different levels, directing the air from the projected sheet downwardly and removing same from the lower portion of the room.

8. The method of controlling distribution of air in a room which consists in stratifying different levels by projecting substantially horizontally across the width of the room opposing sheets of air, the projecting sheets being inclined to each other and impinging intermediate the points of projection, the inclination of the sheets directing the major portion of the projected air from the impingement downwardly, and removing the downwardly directed air from the lower portion of the room.

9. The method of controlling distribution of air in a room which consists in stratifying different levels by projecting substantially horizontally across the width of the room sheets of air approximately sealing the different levels from each other, said air being directed downwardly and removed from the lower portion of the room and projecting a sheet of air downwardly and spaced from but adjacent to a side wall of the room, the sheet along the side wall being projected from a point nearer the first-mentioned sheet than the bottom of the wall, the air directed along the side wall being removed from the lower portion of the room.

10. In an apparatus of the character described, the combination of a room, means projecting substantially horizontally across the width of the room opposing sheets of air spaced from the floor and ceiling of the room and impinging along an intermediate line at the desired level, stratifying the air above the sheet from the floor stratum, said sheets having an area equal to the major portion of the room area and being directed to move the air downwardly, and means removing the air so projected from the lower portion of the room.

11. In an apparatus of the character described, the combination with a room of means projecting substantially horizontally across the width of the room opposing sheets of air spaced from the ceiling and the floor impinging along an intermediate line at a desired level, stratifying the air above the sheet from the floor stratum, the sheet being directed to deliver the projected air downwardly, and means removing the downwardly projected air from the lower part of the room, including means for recirculating at least a portion of the air removed.

HUGH C. LORD.